United States Patent
Shimizu et al.

(10) Patent No.: US 6,183,682 B1
(45) Date of Patent: Feb. 6, 2001

(54) METHOD FOR PREVENTING OCCURRENCE OF IMPACT PRESSURE IN INJECTION MOLDING MACHINE

(75) Inventors: Kenichi Shimizu; Masahiko Miyajima; Daiki Tanemura, all of Nagano (JP)

(73) Assignee: Nissei Plastic Industrial Co., Ltd., Nagano-Ken (JP)

( * ) Notice: Under 35 U.S.C. 154(b), the term of this patent shall be extended for 0 days.

(21) Appl. No.: 09/224,055

(22) Filed: Dec. 31, 1998

(30) Foreign Application Priority Data

Jan. 12, 1998 (JP) .................................................. 10-003773

(51) Int. Cl.[7] .................................................. B29C 45/47
(52) U.S. Cl. ........................ 264/328.1; 425/149; 425/587
(58) Field of Search ........................... 264/328.1, 328.17, 264/40.5, 40.1, 40.7, 349; 425/125, 582, 583, 587, 589, 591, 149; 92/86.5, 142

(56) References Cited

U.S. PATENT DOCUMENTS 3,604,205 * 9/1971 Geselbracht et al. .................. 92/142
5,443,782 * 8/1995 Nakamura et al. ................ 264/328.1
5,641,523 * 6/1997 Shioiri et al. .......................... 425/145
5,688,535 * 11/1997 Koda et al. ............................ 425/145
5,906,778 * 5/1999 Arai et al. .......................... 264/328.1

FOREIGN PATENT DOCUMENTS 8-25450   1/1996   (JP) .

* cited by examiner

Primary Examiner—Jill L. Heitbrink
(74) Attorney, Agent, or Firm—Birch, Stewart, Kolasch & Birch LLP

(57) ABSTRACT

Gas (air) is supplied into an oil transfer line extending between a front oil chamber of an injection cylinder and an oil tank during a molding cycle, excluding an injection step, thereby preventing impact which would otherwise occur due to oil pressure generated upon start of injection in the injection step. Thus, immediately before the start of the injection step, the oil transfer line becomes empty of or almost empty of oil. Accordingly, even when high-pressure oil is supplied into the injection cylinder in an impactive manner upon start of injection, pressure oil ejected from the injection cylinder flows swiftly through the oil transfer line.

9 Claims, 4 Drawing Sheets

METHOD FOR PREVENTING OCCURRENCE OF IMPACT PRESSURE IN INJECTION MOLDING MACHINE

BACKGROUND OF THE INVENTION

1. Field of the Invention

The present invention relates to a method and to an apparatus for preventing the occurrence of impact pressure in an injection molding machine, in order to prevent impact which would otherwise be induced in an injection step by a hydraulic pressure which builds upon the start of injection.

2. Description of the Relevant Art

Conventionally, there are known two screw driving systems for injection molding machines; i.e., a hydraulic drive system and a motor drive system.

As disclosed in Japanese Patent Application Laid-Open (kokai) No. 8 (1996)-25450, in a conventional injection molding machine which employs a hydraulic drive system, a servo valve is changed over upon the start of injection in an injection step so as to supply pressure oil from a hydraulic oil source to the rear oil chamber of an injection cylinder. The supplied pressure oil causes a screw to advance from an injection start position, thereby injecting a measured amount of resin into and filling a mold. Oil contained in the front oil chamber of the injection cylinder returns to an oil tank through an oil transfer line.

Upon the start of the injection, high-pressure oil is supplied into the rear oil chamber of the injection cylinder in an impactive manner, and thus associated impact acts on oil contained in the oil transfer line via a piston, causing a so-called water hammer phenomenon. This water hammer phenomenon is substantially of a negligible degree for ordinary injection molding machines. However, for injection molding machines having a high injection speed, the degree of water hammer cannot be disregarded. Specifically, water hammer becomes obvious in the form of a considerably loud noise (impact sound) or significant vibration, and associated impact pressure has an adverse effect on a hydraulic circuit and hydraulic devices.

SUMMARY OF THE INVENTION

An object of the present invention is to provide a method and an apparatus for preventing the occurrence of impact pressure in an injection molding machine and capable of reliably preventing the occurrence of the water hammer phenomenon to thereby eliminate associated detrimental noise and vibration.

Another object of the present invention is to provide a method and an apparatus for preventing the occurrence of impact pressure in an injection molding machine which can be embodied easily and at low cost and exhibit a wide range of usability such as the application to an existing injection molding machine.

To achieve the above objects, the present invention provides a method for preventing the occurrence of impact pressure in an injection molding machine, wherein gas (air) is supplied into an oil transfer line extending between a front oil chamber of an injection cylinder and an oil tank during a molding cycle, excluding an injection step, thereby preventing impact which would otherwise occur due to oil pressure generated upon the start of injection in the injection step.

The present invention further provides an apparatus for preventing the occurrence of impact pressure in an injection molding machine, comprising a gas supply section for supplying gas (air) into an oil transfer line extending between a front oil chamber of an injection cylinder and an oil tank during a molding cycle, excluding an injection step.

According to the present invention, gas is supplied into the oil transfer line extending between the oil tank and the front oil chamber of the injection cylinder during a molding cycle, excluding an injection step. Thus, immediately before the start of the injection step, the oil transfer line becomes empty of or almost empty of oil. Accordingly, even when high-pressure oil is supplied into the injection cylinder in an impactive manner upon start of injection, pressure oil ejected from the injection cylinder flows swiftly through the oil transfer line, thereby preventing occurrence of a water hammer phenomenon.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and of the scope of the invention will become apparent to those skilled in the art form this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will next be described in detail with reference to the drawings. The accompanying drawings are illustrative of the embodiments and are not meant to limit the scope of the invention. To clarify the invention, detailed description of known parts is omitted.

First, the configuration of an apparatus 1 for preventing the occurrence of impact pressure according to an embodiment of the present invention and the schematic configuration of an injection molding machine having the apparatus 1 will be described with reference to FIGS. 1 and 2.

Figure 1:
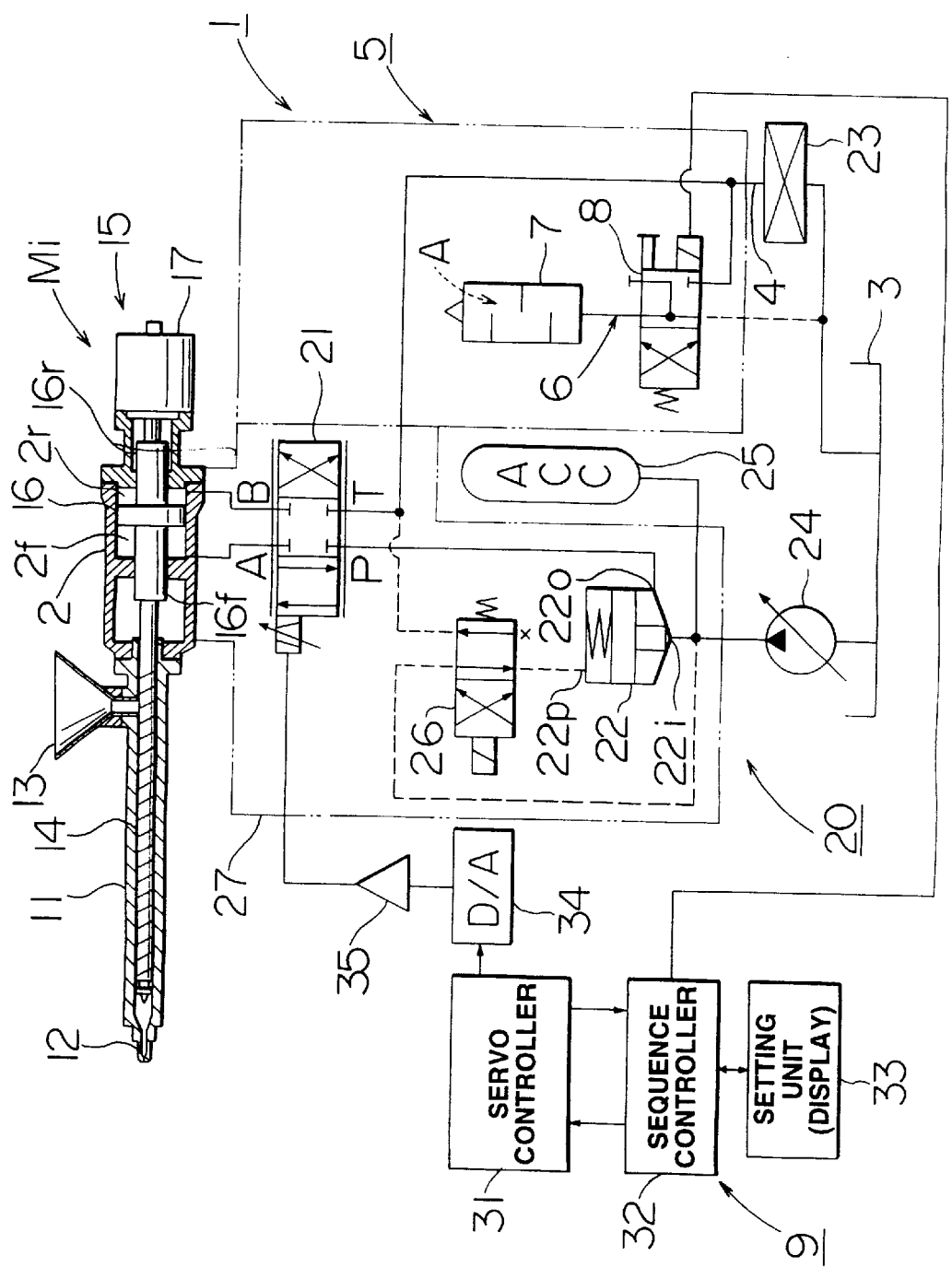
FIG. 1 is a configuration diagram of an injection apparatus, including a hydraulic circuit diagram of an apparatus for preventing occurrence of impact pressure according to an embodiment of the present invention.
Figure 2:
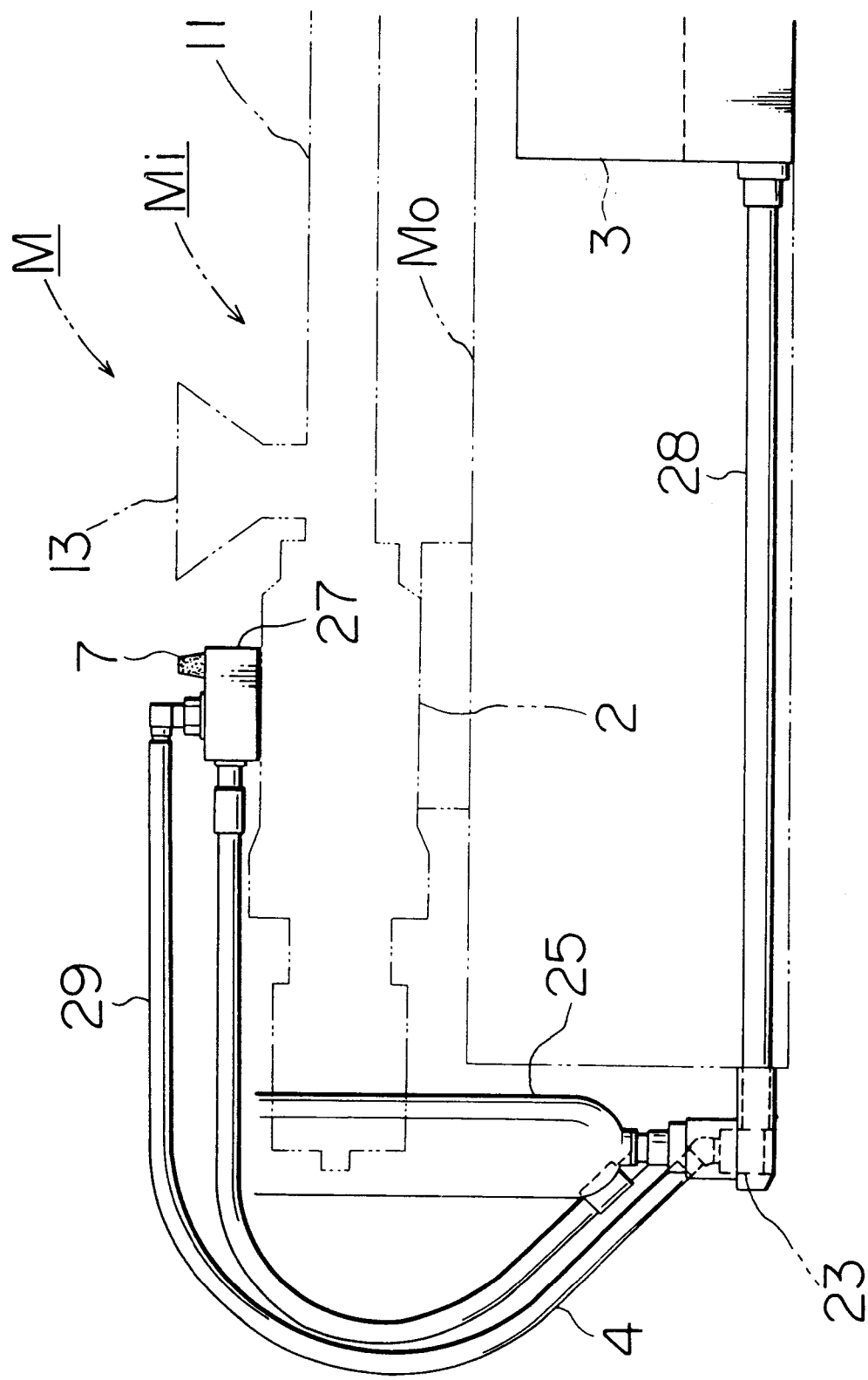
FIG. 2 is an appearance view showing positional relationship among essential portions of the apparatus for preventing occurrence of impact pressure.

In FIG. 1, symbol Mi denotes an injection unit of an injection molding machine M (FIG. 2). The injection unit Mi includes a heating cylinder 11, which has an injection nozzle 12 at a front (left-hand in FIG. 1) end thereof and a hopper 13 at a rear portion thereof. The heating cylinder 11 contains a screw 14, and a screw-driving unit 15 is connected to the rear (right-hand in FIG. 1) portion of the heating cylinder 11. The screw-driving unit 15 includes an injection cylinder 2 which contains a double rod piston 16. A front rod 16f of the piston 16 is coupled with the rear end of the screw 14, and a rear rod 16r is spline-connected to the shaft of an oil motor 17 disposed at the rear end of the injection cylinder 2.

A hydraulic circuit 20 is connected to the injection cylinder 2. The hydraulic circuit 20 includes a four-port servo valve 21. A port A of the servo valve 21 is connected to a front oil chamber 2f of the injection cylinder 2; a port B is connected to a rear oil chamber 2r of the injection cylinder; a port P is connected to a discharge port 22o of a logic valve (pilot-operated check valve) 22; and a port T of the servo valve 21 is connected to a manifold 23 via an oil transfer line 4. The manifold 23 is connected to an oil tank 3. Numeral 24 denotes a hydraulic pump, whose suction port is connected to the oil tank 3 and whose discharge port is connected to a supply port 22i of the logic valve 22 and to an accumulator 25. A pilot port 22p of the logic valve 22 is connected to the port T of the servo valve 21 and to the supply port 22i of the logic valve 22 via a three-way valve 26.

FIG. 2 shows positional relationships among essential portions of the injection molding machine M. A phantom line represents a base frame Mo of the injection molding machine M and an injection unit Mi supported on the top surface of the base frame Mo. Numeral 27 denotes a hydraulic circuit unit, which is mounted on an upper surface of the injection unit Mi (injection cylinder 2). The hydraulic circuit unit 27 corresponds to a portion enclosed by a phantom line in FIG. 1 and includes the servo valve 21, the logic valve 22, and the three-way valve 26. The manifold 23 is mounted at a lower end portion of the base frame Mo and is connected to the hydraulic circuit unit 27 (servo valve 21) via the oil transfer line 4. The oil tank 3 is disposed at a lower portion of the base frame Mo, which is located below the injection cylinder 2, and is connected to the manifold 23 via an oil transfer line 28. In FIG. 2, numeral 25 denotes an accumulator, and numeral 29 denotes an oil transfer line extending between the accumulator 25 and the hydraulic circuit unit 27 (logic valve 22).

In FIG. 1, numeral 1 denotes an apparatus for preventing occurrence of impact pressure. The apparatus 1 includes a gas supply section 5 for supplying gas (air) A into the oil transfer line 4, which extends between the front oil chamber 2f of the injection cylinder 2 and the oil tank 3 located below the injection cylinder 2, at a portion offset toward the injection cylinder 2. The gas supply section 5 includes an atmospheric communication section 6 for establishing communication between the atmosphere and the portion of the oil transfer line 4 offset toward the injection cylinder 2. The atmospheric communication section 6 includes an on-off valve (solenoid valve) 8 for opening and closing the atmospheric communication section 6 as well as an air filter 7 provided at the tip thereof. The atmospheric communication section 6 including the on-off valve 8 and the air filter 7 is disposed in the hydraulic circuit unit 27. By opening of the on-off valve 8, the portion of the oil transfer line 4 offset toward the injection cylinder 2 communicates with the atmosphere via the atmospheric communication section 6 including the air filter 7.

Numeral 9 denotes a controller, which includes a servo controller 31, a sequence controller 32, and a setting unit 33 including a display. The servo controller 31 controls the servo valve 21 based on detected values of pressure, position, etc. received from various unillustrated sensors as well as instruction values received from the sequence controller 32. A control signal output from the servo controller 31 is sent to the servo valve 21 via a digital-to-analog signal converter 34 and an amplifier 35. The sequence controller 32 sends a switching signal to the on-off valve 8. The switching signal causes the on-off valve 8 to be opened (as depicted by a left-hand symbol in FIG. 1) during a set period of time Ts between completion of a measuring step and completion of a mold clamping step and causes the on-off valve 8 to be closed (as depicted by a right-hand symbol in FIG. 1) during the remainder of a molding cycle.

Figure 4:
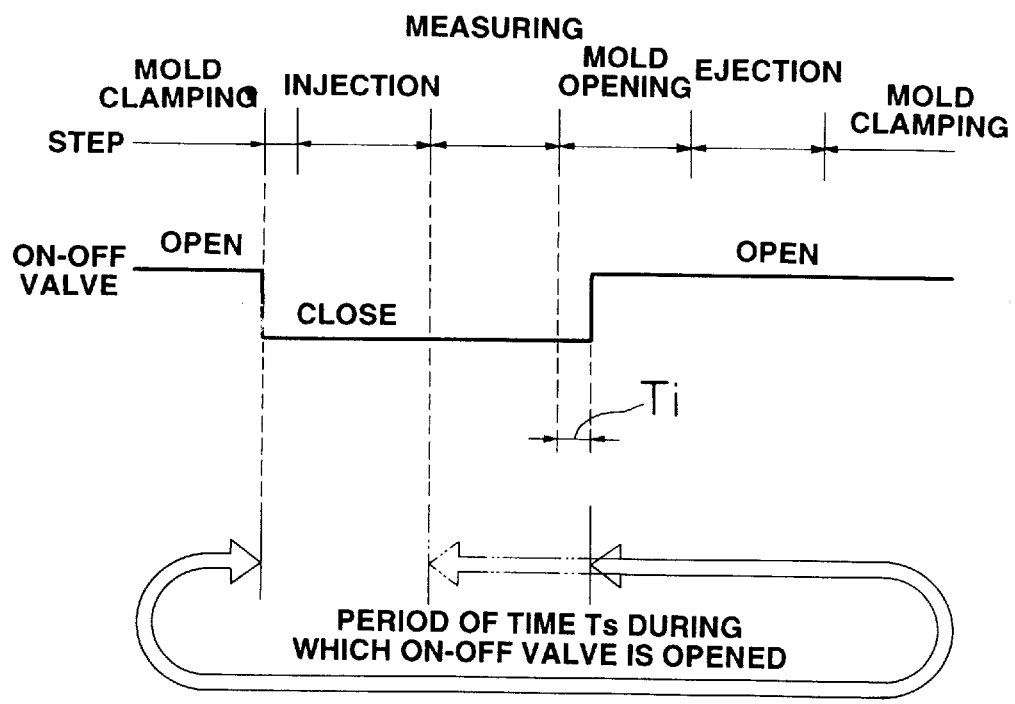
FIG. 4 is a timing chart for explaining the method for preventing occurrence of impact pressure.

As shown in FIG. 4, the set period of time Ts extends from a point in time when an allowance time Ti has elapsed after completion of the measuring step to a point in time when the mold clamping step has been completed. The allowance time Ti is employed to ensure that the on-off valve 8 opens after the measuring step ends completely. Meanwhile, the on-off valve 8 must be completely closed at a point in time when an injection step starts. Usually, there exists some idle time between completion of the mold clamping step and start of the injection step. Accordingly, by closing the on-off valve 8 upon completion of the mold clamping step, the on-off valve 8 can be completely closed at a point in time when the injection step starts. In the case where the injection step starts immediately after completion of the mold clamping step, control may be performed so as to close the on-off valve 8 before completion of the mold clamping step.

Figure 3:
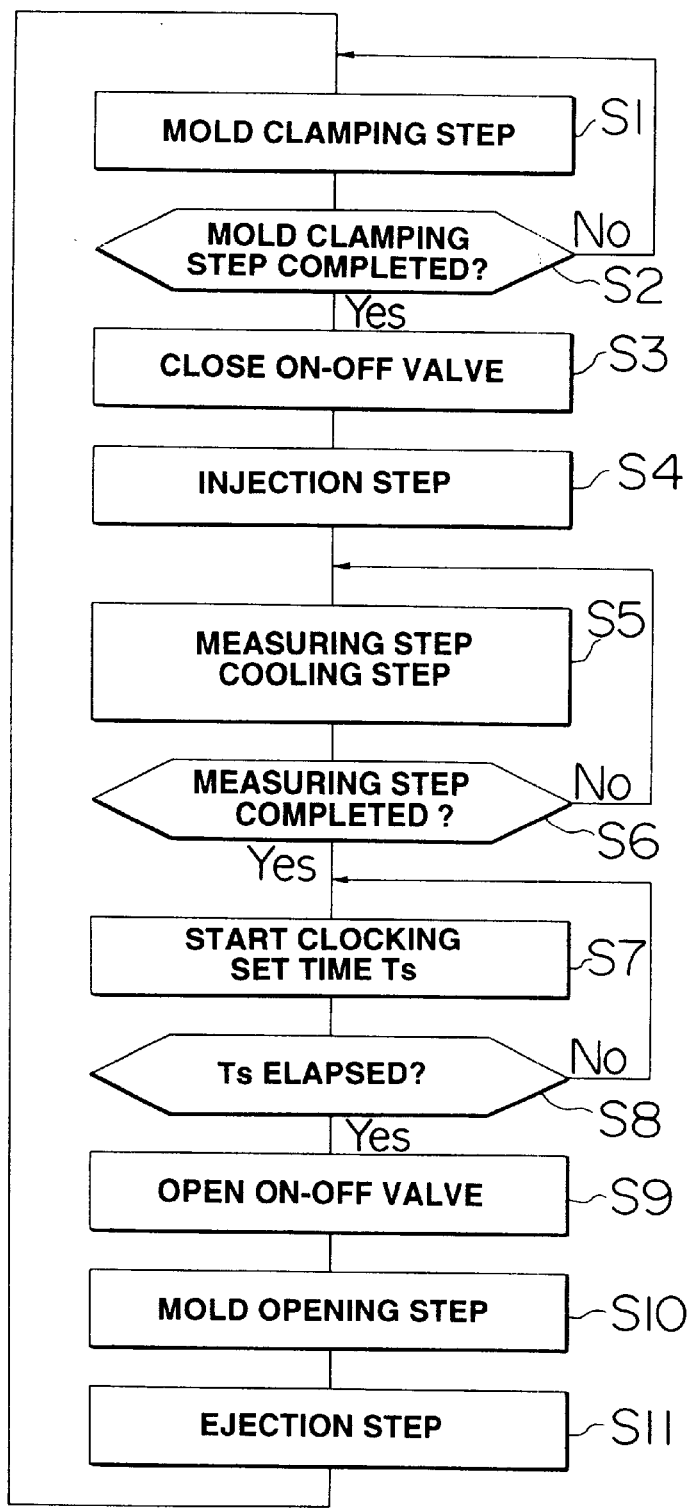
FIG. 3 is a flow chart illustrating a method for preventing the occurrence of impact pressure according to the embodiment.

A method for preventing the occurrence of impact pressure according to the present embodiment and including the operation of the apparatus 1 for preventing occurrence of impact pressure will next be described with reference to FIGS. 1, 2, and 4 and according to the flow chart of FIG. 3.

Suppose that a molding cycle is in the mold clamping step (step S1). In the mold clamping step, the on-off valve 8 is opened as shown in FIG. 4; thus, the portion of the oil transfer line 4 offset toward the injection cylinder 2 communicates with the atmosphere through the atmospheric communication section 6, i.e., through the on-off valve 8 and the air filter 7. Accordingly, oil contained in the oil transfer line 4 naturally drops into the oil tank 3, and air A is drawn (supplied) into the oil transfer line 4 through the atmospheric communication section 6 including the air filter 7.

When the mold clamping step is completed, the sequence controller 32 issues a switching signal to the on-off valve 8 in response to a received signal indicative of the completion of the mold clamping step. The switching signal causes the on-off valve 8 to be closed (as depicted by the right-hand symbol in FIG. 1) (steps S2 and S3). As a result, the oil transfer line 4 is shut off from the atmosphere, so that air A is not supplied to the oil transfer line 4.

The injection step is performed while the on-off valve 8 is completely closed (step S4). In the injection step, the servo valve 21 is controlled so as to supply pressure oil from the accumulator 25 into the rear oil chamber 2r of the injection cylinder 2 via the logic valve 22 and the servo valve 21, thereby advancing the piston 16. In the injection molding machine M to which the present invention is applied and whose injection speed is high, upon the start of the injection, high-pressure oil is supplied into the rear oil chamber 2r of the injection cylinder 2 in an impactive manner, and thus associated impact acts on oil contained in the oil transfer line 4 via the piston 16. However, the on-off valve 8 is held open until just before the start of injection, so that air A is supplied into the oil transfer line 4. Thus, immediately before the start of injection, the oil transfer line 4 is empty of or almost empty of oil. Accordingly, upon the start of injection, oil ejected from the front oil chamber 2f of the injection cylinder 2 flows swiftly through the oil transfer line 4, thereby preventing the occurrence of the water hammer phenomenon.

Next, upon completion of the injection step, the measuring step is performed in the injection unit Mi, whereas a cooling step is performed on a mold (step S5). Upon elapse of the set allowance time Ti after completion of the measuring step, the sequence controller 32 issues a switching signal to the on-off valve 8 so as to open the on-off valve 8 (as depicted by the left-hand symbol in FIG. 1)(steps S6, S7, S8, and S9). As a result, the oil transfer line 4 communicates with the atmosphere through the atmospheric communication section 6, i.e., through the on-off valve 8 and the air filter 7. Accordingly, oil contained in the oil transfer line 4 naturally drops into the oil tank 3, and air A is drawn (supplied) into the oil transfer line 4 through the atmospheric communication section 6 including the air filter 7. Subsequently, a mold opening step and an ejection step are carried out, followed by the above-mentioned mold clamping step (steps S10, S11, and S1).

As described above, in the apparatus 1 and the method for preventing occurrence of impact pressure according to the present embodiment, gas A is supplied into the oil transfer line 4, which extends between the front oil chamber 2f of the injection cylinder 2 and the oil tank 3, at the portion offset toward the injection cylinder 2 during each molding cycle, excluding the injection step. Thus, immediately before the start of the injection step, the oil transfer line 4 becomes empty of or almost empty of oil. As a result, even when high-pressure oil is supplied into the injection cylinder 2 in an impactive manner upon the start of injection, pressure oil ejected from the injection cylinder 2 flows swiftly through the oil transfer line 4, thereby reliably preventing the occurrence of a water hammer phenomenon and eliminating associated detrimental noise and vibration. According to the employed configuration, the oil transfer line 4 extending between the front oil chamber 2f of the injection cylinder 2 and the oil tank 3 located below the injection cylinder 2 is caused to communicate with the atmosphere at the portion offset toward the injection cylinder 2, so that oil contained in the oil transfer line 4 naturally drops into the oil tank 3. This configuration can be easily embodied at low cost and can be attached to an existing injection molding machine, thus exhibiting a wide range of usability.

Figure 5:
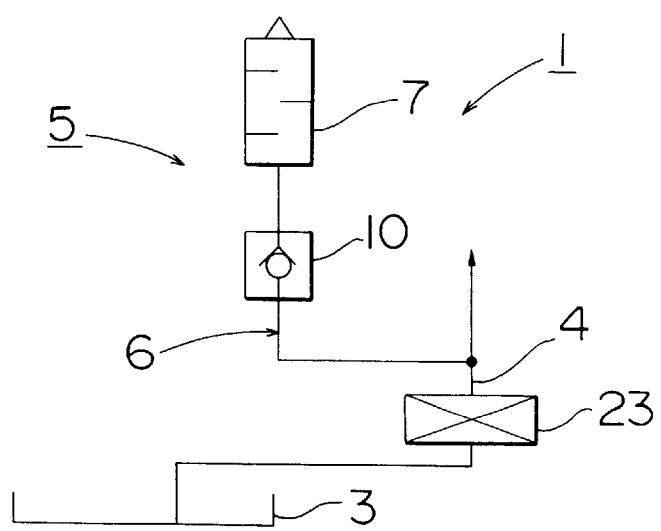
FIG. 5 is a partial hydraulic circuit diagram of an apparatus for preventing the occurrence of impact pressure according to another embodiment of the present invention.

FIG. 5 shows an apparatus 1 for preventing occurrence of impact pressure according to another embodiment of the present invention. According to the present embodiment, a check valve 10 is provided as means for establishing communication with the atmosphere of the oil transfer line 4, which extends between the front oil chamber 2f of the injection cylinder 2 and the oil tank 3 located below the injection cylinder 2, at the portion offset toward the injection cylinder 2. The check valve 10 serves both as the atmospheric communication section 6 and the controller 9 and functions in the following manner. In the injection step, oil pressure within the oil transfer line 4 causes the check valve 10 to be closed. In the molding steps other than the injection step, oil pressure within the oil transfer line 4 usually drops. As a result, the check valve 10 permits air A to pass therethrough and to flow into the oil transfer line 4, thereby causing oil contained in the oil transfer line 4 to naturally drop into the oil tank 3. The present embodiment is applicable to the case where oil pressure within the oil transfer line 4 meets certain conditions during a molding cycle.

The present invention is not limited to the above-described embodiments. Modifications and variations are possible without departing from the spirit or scope of the invention.

For example, the set period of time Ts may be set to any period of time within a molding cycle, excluding the injection step. As represented by a phantom line in FIG. 4, the on-off valve 8 may be opened after completion of the injection step. Alternatively, the on-off valve 8 may be opened after completion of the mold opening step and be closed after completion of the ejection step. Also, the above embodiments are described while mentioning the natural drop of oil contained in the oil transfer line 4 and associated intake of gas A. However, gas A may be forced into the oil transfer line 4 through use of a blower. Further, gas A may be inert gas other than air. Moreover, a negative pressure application section may replace the gas supply section 5 so as to apply a negative pressure to the interior of the oil transfer line 4. In this case, preventive effect against a water hammer phenomenon is also yielded as in the case of supply of gas A.

The invention being thus described, it will be obvious that the same may be varied in many ways. Such variations are not to be regarded as a departure from the spirit and scope for the invention, and all such modifications as would be obvious to one skilled in the art are intended to be included within the scope of the following claims.

What is claimed is:

1. A method for preventing occurrence of impact pressure in an injection molding machine comprising the following steps:

supplying gas into an oil transfer line extending between a front oil chamber of an injection cylinder and an oil tank during a molding cycle; and terminating the supply of gas during an injection step.

2. The method for preventing occurrence of impact pressure in an injection molding machine according to claim 1, wherein the supplying of gas into the oil transfer line occurs at a portion in the vicinity of the injection cylinder.

3. The method for preventing occurrence of impact pressure in an injection molding machine according to claim 1, wherein the supplying of gas occurs during a set period of time extending between completion of a measuring step and completion of a mold clamping step.

4. The method for preventing occurrence of impact pressure in an injection molding machine according to claim 2, wherein the supplying of gas occurs during a set period of time extending between completion of a measuring step and completion of a mold claming step.

5. The method for preventing occurrence of impact pressure in an injection molding machine according to claim 1, and further including the step of providing communication with the atmosphere of the interior of the oil transfer line extending between the front oil chamber of the injection cylinder and the oil tank located below the injection cylinder, oil contained in the oil transfer line drops naturally into the oil tank.

6. The method for preventing occurrence of impact pressure in an injection molding machine according to claim 1, wherein the supplying of gas occurs in a gas supply section for supplying gas into the oil transfer line extending between the front oil chamber of the injection cylinder and the oil tank during the molding cycle and for terminating the supply of gas during the injection step.

7. The method for preventing occurrence of impact pressure in an injection molding machine according to claim 6, wherein the supplying of gas in the gas supply section includes the steps of providing an atmospheric communication section for establishing communication with the atmosphere of the oil transfer line extending between the front oil chamber of the injection cylinder and the oil tank located below the injection cylinder; providing an on-off valve for opening and closing said atmospheric communication section; and providing a controller for controlling the on-off valve.

8. The method for preventing occurrence of impact pressure in an injection molding machine according to claim 7, and further comprising the steps of providing an air filter located at a tip of said atmospheric communication section.

9. The method for preventing occurrence of impact pressure in an injection molding machine according to claim 6, and further including providing said gas supply section with a check valve for establishing communication with the atmosphere of the interior of the oil transfer line extending between the front oil chamber of the injection cylinder and the oil tank located below the injection cylinder to thereby permit intake of air into the oil transfer line.

* * * * *